Sept. 10, 1957  J. J. COBIN  2,805,514
INSULATING TABLE PAD AND COVER
Filed Oct. 24, 1952
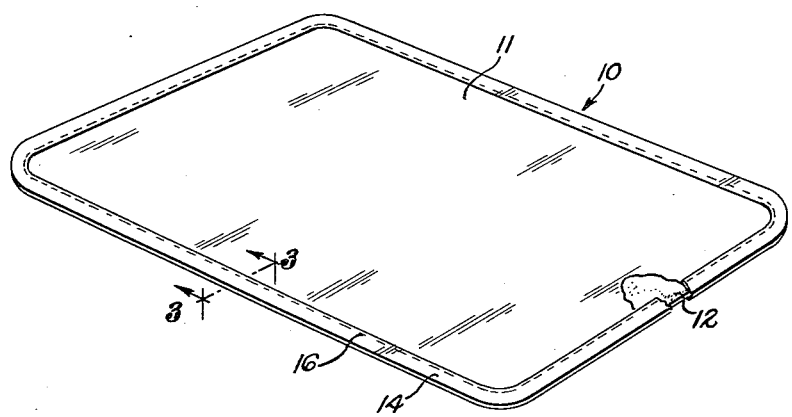
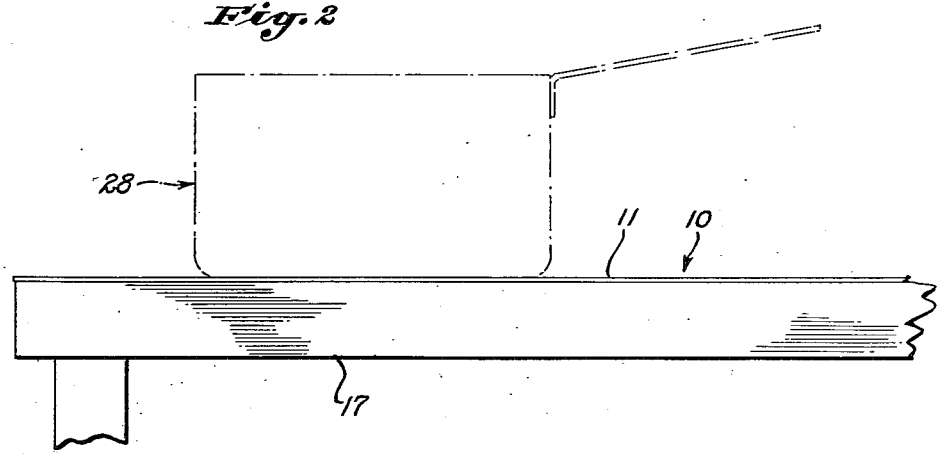
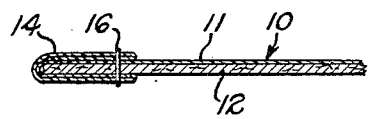
INVENTOR:
JOSEPH J. COBIN
BY HIS ATTORNEYS
HARRIS, KIECH, FOSTER & HARRIS

2,805,514
INSULATING TABLE PAD AND COVER

Joseph J. Cobin, Los Angeles, Calif.

Application October 24, 1952, Serial No. 316,723

1 Claim. (Cl. 45—68.4)

This invention relates to improvements in table coverings and, more particularly, to a table covering which is waterproof and which also presents an attractive appearance.

There have been offered in the past, for use as table coverings, many types of fabrics such as the well-known oilcloth and various types of plastic table coverings designed, primarily, to prevent the soiling or staining of table surfaces by water, condiments, or various foods served on the covering. However, all of these prior art coverings have had one major disadvantage in common and that is the fact that all of them were extremely susceptible to injury by heated vessels placed upon their surfaces.

This is particularly true in the case of plastic films which have come upon the market more recently since even a hot dish will cause the fusing of the plastic film forming holes in the film and, also, adhesively securing the entire table covering to the surface of the table at the point where the dish was placed upon the covering. Of course, if hot vessels such as casseroles and pots were set upon the table covering, the results are even more disastrous. Thus, due to their inherent fragility and sensibility to injury by heat, these table coverings have not become widely accepted.

Furthermore, in conventional table coverings of the character under consideration, it has been found that they are extremely susceptible to ripping and tearing once the slightest opening is formed therein. This is due to the fact that plastic table coverings in particular are not provided with fabric reinforcement of any kind and thus when a single opening or puncture is formed therein the resultant tearing of the covering is almost inevitable.

It is, therefore, an object of my invention to provide a composite table covering wherein the imperviousness of the plastic fabrics to water and food stains is augmented by resistance to injury by heated vessels, pots, or plates placed upon the plastic fabric.

Another object of my invention is the provision of a table covering of the aforementioned character which is reinforced by an auxiliary cotton fiber sheet which prevents the tearing of the plastic fabric despite the formation therein of small punctures or openings.

Other objects and advantages of my invention will be apparent from the following specification and the accompanying drawing in which:

Fig. 1 is a table covering constructed in accordance with my invention;

Fig. 2 shows the table covering of my invention in use on a table; and

Fig. 3 is a transverse sectional view taken on the line 3—3 of Fig. 1.

Referring to the drawing and particularly to Figs. 1 and 3 thereof, I show a table covering 10 constructed in accordance with my invention, said table covering including a first, upper layer 11 constituted by a sheet of plastic material of a flexible nature such as, for instance, a sheet of vinyl chloride which is generally available under such trademarks as "Vinylite," "Koroseal," and other well-known flexible sheets or films formed from plastic material. Also usable for the upper layer 11 are other films formed of vinyl and vinyl copolymers and, in addition, sheets or films formed from polystyrene. The above referred to plastics are presented for purposes of illustration only and as indicative of the wide variety of plastic films or flexible plastic sheets which may be utilized as the upper layer, it being obvious, of course, that other flexible sheets or films of plastic may be utilized and substituted for the above referred to specific types of plastic materials.

Disposed below the first, upper layer 11 is a second, lower layer 12 formed from a sheet of felted material such as cotton fibers or intermingled cotton and wool fibers, said lower sheet 12 being attached to the upper sheet 11 by means of a peripheral binding 14 which may be made from the same film as the upper layer and which is secured to the edges of the upper and lower sheets 11 and 12, respectively, by means of stitching 16 or similar expedients.

The table covering 10 is disposed on a table 17 with the first layer 11 of plastic film uppermost, thus presenting a surface for use which is impervious to water and stains and thus protecting the surface of the table 17. The lower layer 12 of felted cotton or intermixed cotton and wool engages the upper surface of the table 17. By the combination of the plastic film layer 11 and the felted cotton or intermixed cotton and wool layer 12, I have attained results which cannot be achieved by the use of either of the individual components of the table covering 10 alone.

In the first place, the felted cotton lower layer 12 provides a reinforcement for the upper layer 11 of plastic film so that when minute punctures are formed in the upper layer 11 of plastic film and a strain is imposed upon the plastic film which would ordinarily cause the tearing or rupture thereof, the major portion of the load is sustained by the felted cotton layer 12 which prevents the tearing of the plastic upper layer 11 and thus materially prolongs the life of the table covering 10.

Moreover, when the table covering 10 is disposed upon a table 17, as best shown in Fig. 2 of the drawing, the lower layer 12 of felted cotton material causes an opaque appearance to be imparted to the upper layer 11 of plastic material and renders the entire table covering 10 more attractive, presenting the appearance of a conventional linen or cotton table cloth.

In addition, the lower layer 12 of felted cotton material frictionally engages the surface of the table 17 in a manner such that the table covering 10 is caused to be retained upon the table, which is a material improvement over conventional table coverings formed of sheets of plastic material alone since the smooth surface and light weight of such table coverings frequently permit them to be inadvertently swept from the table when they are wiped or when they are inadvertently disturbed during the passage of a person by the table.

Of course, as pointed out above, the major advantage of the construction of the table covering 10 is the fact that when a vessel such as the pot 18, shown in Fig. 2, which has been heated to a relatively high temperature, is disposed upon the plastic film constituting the upper layer 11 of the table cover 10, no injury results to the plastic film 11 although if the plastic film which constitutes the upper layer 11 of the table covering 10 were utilized alone the film would be melted and fused to the surface of the table, thus damaging the table and destroying the film. However, by the combination of the plastic film upper layer 11 with the felted cotton or intermixed cotton and wool lower layer 12, I have eliminated this possibility of injury to the upper layer 11. This is in spite of the fact that if the lower layer 12 is utilized by itself, substantial injury to the lower layer 12 will also result.

Although considerable experimentation has been made with the table covering 10 in an empirical fashion, I have been unable to establish physical reason for the manner in which the extremely thin plastic film and the relatively thin felted under layer, whose thickness is less than one thirty-second of an inch, cooperate to achieve a result which is not achievable by the utilization of the individual components by themselves under the circumstances referred to above.

However, it is my theory that when a heated vessel is placed upon the plastic film which constitutes the upper layer 11, the normal tendency of the plastic film to melt and fuse instantaneously is prevented by the absorption of the initial heat impact in the lower felted layer 12. One difficulty with this theory of operation is the fact that there is no explanation as to how the two layers cooperate after the initial placement of a heated vessel upon the plastic film of the upper layer to continue to prevent the fusing and consequent destruction of the upper layer and the injury to the surface of the table below the lower layer since the heated vessel may remain at relatively elevated temperatures for a long period of time and the theory that the felted lower layer initially absorbs the heat would not obviate the fact that ultimately the heat would penetrate through the lower layer and injure the surface of the table upon which the table covering is used.

Nevertheless, I have found by repeated tests that injury to the table will not result nor will the upper layer of plastic film be in any way impaired by a prolonged exposure to vessels at relatively elevated temperatures.

Obviously, the provision of a table covering of this character eliminates the necessity for the use of conventional, extremely thick and bulky, table pads which are customarily used to isolate the surface of a table from heated vessels placed upon the table covering which has been draped over the table pad. Furthermore, table coverings of the character of my invention may be manufactured at a cost which is far less than the cost of conventional thick insulated table pads and, furthermore, in informal dining there is no necessity for providing an additional table covering in addition to my invention due to the appearance of opacity imparted to the upper layer 11 by the under layer 12 which presents a remarkably attractive and decorative appearance.

I claim as my invention:

A two ply insulating table covering comprising in combination; an upper sheet of vinyl plastic film, a lower sheet of cotton fabric disposed beneath said upper sheet with its upper surface in contact with said upper sheet and with its lower surface exposed for contact with a table surface to be protected to prevent said table covering from slipping thereacross; and a fastening binding formed from the same material as said upper sheet stitched to the edges of said sheets to fasten said edges together, said stitching comprising the only stitching in said table covering, said upper sheet being imperforate except for the stitching perforations at said edge binding, said upper and lower sheets forming a covering which resists heat and deformation and sticking of the upper sheet.

References Cited in the file of this patent

UNITED STATES PATENTS

| | | |
|---|---|---|
| 2,093,083 | Klau | Sept. 14, 1937 |
| 2,522,612 | Harben | Sept. 19, 1950 |
| 2,586,153 | Eisman | Feb. 19, 1952 |
| 2,670,567 | Meyer | Mar. 2, 1954 |